United States Patent [19]

Powers

[11] 3,947,248

[45] Mar. 30, 1976

[54] CLARIFICATION OF AQUEOUS WASTE STREAMS CONTAINING DISPERSED DYES

[75] Inventor: J. Bruce Powers, Williamsburg, Va.

[73] Assignee: The Dow Chemical Company, Midland, Mich.

[22] Filed: Oct. 26, 1973

[21] Appl. No.: 410,077

[52] U.S. Cl. .................................... 8/81; 210/30 R
[51] Int. Cl.² .......................................... D06P 5/00
[58] Field of Search ................................... 8/80, 81

[56] References Cited
UNITED STATES PATENTS 3,829,380    8/1974    Oohara ..................................... 8/80

Primary Examiner—Donald Levy
Attorney, Agent, or Firm—L. Wayne White

[57] ABSTRACT

Polyester textile yarns and fabrics are normally dyed with organic pigments dispersed in water. The waste streams from this process contain residual amounts of color bodies which are removed by the instant process which comprises adding a sufficient amount of a water-soluble cationic polymer (e.g. polyethylenimine) to flocculate the color bodies.

8 Claims, No Drawings

CLARIFICATION OF AQUEOUS WASTE STREAMS CONTAINING DISPERSED DYES

BACKGROUND OF THE INVENTION

Polyester textile fabrics and yarns are normally dyed in a multistep procedure using organic pigments dispersed in water with an anionic surfactant. In step 1, the fabric or yarn is immersed in a hot (e.g. 135°C) dye bath comprising from about 0.1 to 12 weight percent of the organic pigment dispersed in water made acidic (pH 4.5 or less) with a water-soluble organic acid, such as acetic or oxalic acid. In step 2, the dye bath is drained and the dyed fabric scrubbed with hot aqueous caustic and sodium hydrosulfite or preferably with hot (e.g. 80°C) water having from 2-5 weight percent of a chlorinated solvent dispersed therein (e.g. perchloroethylene). In step 3, the aqueous waste stream from step 2 is discharged and the fabric is rinsed with hot (e.g. 80°C) water. In step 4, the rinse water is discharged and the fabric partially dried by vacuum or by centrifical force. The dyed fabric is then usually dried in a forced-air oven and stored for further processing.

In each of steps 1–4 above, an aqueous waste stream is generated that contains residual amounts of the dispersed organic dye. Ecological considerations obviously prohibit direct discharge of these waste streams. However, no satisfactory economical method has been heretofore available to purify (decolorize) waste streams containing dispersed organic dyes.

SUMMARY OF THE INVENTION

An excellent process has now been discovered for removing dispersed organic dyes from aqueous waste streams.

The novel process comprises (1) adding a sufficient amount of a water-soluble cationic resin(s) to the waste stream to flocculate the dispersed organic dyes, and (2) thereafter separating the floc from the effluent. The effluent is normally clear and essentially colorless and has a pH of 5 or less and it may be either discharged or recycled for further use. A novel "closed loop" dyeing process is possible by recycling the decolorized water and using it as the aqueous media for the dye bath, the scouring water and/or the rinse water in the aforementioned dyeing process.

The term "water-soluble cationic resins" defines a known class of compounds having many members, each of which is suitable for use herein. Such resins normally contain a plurality of nitrogen, sulfur or phosphorus atoms. The polyalkylenepolyamines and the amine-modified polyepihalohydrins (U.S. Pat. No. 3,746,678 and U.S. Pat. No. 3,753,931) are the preferred species. The polyethylenepolyamines, polyethylenimines and polyepichlorohydrins modified by reaction with ethylenediamine are the most preferred cationic resins. The average molecular weight of the resins can be varied from about 1,000 to about 1,000,000 or more. Those at the lower end of the molecular weight range are generally less effective than those having higher molecular weights. However, the resins having extremely high molecular weights tend to be extremely viscous and are difficult to handle. Accordingly, those resins having an average apparent molecular weight (as determined by light scattering techniques) of from about 40,000 to about 120,000 are preferred.

Examples of suitable such resins include polyethylenepolyamine; poly (1,3-propylene) Polyamine; polyethylenimine; polypropylenimine; polyepichlorohydrin reacted with at least 3 moles of ethylenediamine, diethylenetriamine or 1,3-propanediamine per pendant chloromethyl group on the polyepichlorohydrin backbone; homopolymers or interpolymers of ar-vinylbenzyl chloride reacted with trimethylamine, triethylamine, dimethylsulfide, diethylsulfide, pyridine, tetrahydrothiophene, and the like or similar polymers prepared by reacting chloromethylated homopolymers or interpolymers of styrene having an average of from about 0.4 to 1 chloromethyl groups per aromatic nucleus with such nitrogen- or sulfur-containing compounds; and other like cationic polymers. The above listing of resinous compounds is merely a list of representative compounds and other species within the class will be readily obvious to those skilled in the art.

The amount of cationic polymer used in the instant decolorizing process will vary depending upon the amount and type of color bodies in the aqueous waste streams. However, the amount of cationic polymer required for best flocculation results is easily determined by monitoring the system with a streaming current detector. It is important, for the purpose of this invention, to add only the minimum amount of water-soluble cationic resin necessary to neutralize substantially all the charges on the dispersed dye particles for two reasons: First, the optimum rate of flocculation (aggregation) occurs at this point. Second, the effluent can then be recycled to the dye vats leading to a "closed-loop" dye process. The effluent cannot be recycled if it contains more than about 10 parts per million (ppm) of the water-soluble cationic resin and good flocculation is not achieved when excess cationic resin is used. The minimum amount of cationic resin to use is easily determined by use of the streaming current detector for a rapid change in the amperage passing through the test liquid is observed at the titration end-point. Ideally, the cationic resin is added in an amount just short of, or precisely at, this titration end-point.

The streaming current detector, accessories therefor, and a technique for determining the minimum amount of flocculant (e.g. polyethylenimine) necessary to remove suspended particles from municipal waste streams are described, for example, in U.S. Pat. Nos. 3,368,144, 3,368,145, 3,369,984, 3,502,965, 3,526,827 and in an article by W. F. Gerdes (J. Inst. Soc. Am. 13 (12), 38 (1966)).

The floc formed by the instant process can be separated from the aqueous effluent by any one of several conventional techniques. For example, by sedimentation, filtration, floatation, centrifugation, or one or more of the foregoing physical separatory processes in combination. The flocculation process is promoted by the use of clays, such as Fuller's earth, bentonite and the like. A particularly good rate of flocculation has been observed by sequentially adding the cationic resins (as per the above), clay (up to about 1000 ppm), and minor amounts of an anionic polyelectrolyte (e.g. from about 1–5 ppm of a water-soluble, partially hydrolyzed polyacrylamide). The floc thus formed is very easily separated from the aqueous effluent by the aforementioned techniques.

The following examples further illustrate the invention:

General Procedure

An aqueous solution of a water-soluble cationic polymer selected from the group consisting of polyethylenimine (avg. apparent mol. wts. of 1800, 40,000 to 60,000 or 100,000 to 120,000), or the reaction product of polyepichlorohydrin with at least 3 moles of ethylenediamine (avg. apparent mol. wt. of about 40,000 to 60,000) was added dropwise with stirring to spent aqueous dye bath containing up to about 0.2 weight percent of a dispersed dye until the titration end-point was noted on a streaming current detector. The aqueous waste had a pH of 4.5 or less and was at a temperature of from ambient up to about 50°C during the addition of the cationic resin. After the cationic polymer was added, the mixture was pumped to a second vessel wherein about 500 ppm of Fuller's earth was added with stirring. This mixture was pumped to a third vessel wherein from 2-4 ppm of a partially hydrolyzed polyacrylamide (Purifloc A23) was added with stirring. The mixture was then pumped into a clarifier where the floc separated by sedimentation. A clear, essentially colorless effluent was drawn off the top. At this point, the effluent contained less than 10 ppm residual cationic resin and was discharged or recycled. When it was recycled, it was polished by passing it through a filter bed of activated carbon and then returned for use in preparing the dye bath, the scouring water and/or the rinse water. The pH of the recycled effluent was less than about 4.5–5. If the pH was greater than 5, the effluent was first passed through an ion exchange column to convert the organic acid salts (e.g. sodium acetate) formed as by-products in the dyeing process back into the free acids and the pH of the effluent dropped below 4.5. Alternatively, the pH was adjusted by adding more organic acid.

Aqueous dispersions of the following dyes were decolorized using the above general procedure:

Dispersed Dyestuffs by Color Index Number or Trade Name

| | | | | | |
|---|---|---|---|---|---|
| Red: | R-54 | Orange: | O-5 | Yellow: | Y-42 |
| | R-55 | | O-29 | | Y-53 |
| | R-68 | | O-41 | | Y-54 |
| | R-91 | | O-45 | | Y-64 |
| | R-92 | | O-56 | | Y-114 |
| | R-159 | | O-61 | | Y-126 |
| | R-167 | | O-66 | | Y-131 |
| Blue: | B-60 | Navy Blue: | NB-94 | Black: | Foron SK |
| | B-83 | | NB-122 | | Terasil SRB |
| | B-95 | | NB-125 | | Terasil BM |
| | B-118 | | NB-174 | | Resolin HT |
| | | | | | Amacron KS |

In most instances, the dispersed dyestuffs were removed essentially completely during the above treatment. In the few remaining instances, the trace amounts of dyestuff remaining were removed by passing the effluent through a filter bed of activated charcoal.

Other water-soluble cationic polymers as defined above can be similarly used in the instant decolorizing process.

I claim:

1. A process for decolorizing acidic, aqueous waste dye streams having minor amounts of organic dye or dyes dispersed with an anionic surfactant in an aqueous media at a pH of up to about 4.5 at a temperature of from ambient up to about 50°C, said process comprising the steps of (1) adding a water-soluble cationic polymer to the waste stream in an amount sufficient to neutralize substantially all negative charges associated with the dispersed dye or dyes thereby causing a solid floc to form, and (2) separating the solid floc formed in step (1) from the effluent.

2. The process defined by claim 1 wherein said cationic polymer is a water-soluble polyalkylenepolyamine or an amine-modified polyepihalohydrin.

3. The process defined by claim 2 wherein said cationic polymer is a polyethylenepolyamine, a polyethylenimine or a polyepichlorohydrin modified with ethylenediamine.

4. The process defined by claim 2 wherein said cationic polymer has an average molecular weight of at least about 1,000.

5. The process defined by claim 4 wherein said molecular weight is from about 40,000 to about 120,000.

6. The process defined by claim 3 wherein the average molecular weight of said cationic polymer is from about 40,000 to about 120,000.

7. The process defined by claim 1 comprising the additional step of passing the effluent from step (2) through a filter bed of activated carbon.

8. A closed loop textile dyeing process comprising the steps of:
1. immersing the undyed textile in an acidic, aqueous dye bath having a minor amount of organic dye or dyes dispersed with an anionic surfactant in an aqueous media at a pH of up to about 4.5 for a time sufficient to dye the textile, 4.5
2. removing the dyed textile from the dye bath in step (1),
3. scouring the dyed textile from step (2) by contacting the dyed textile with water having minor amount of a chlorinated solvent dispersed therein with an anionic surfactant,
4. removing the dyed textile from the scouring water in step (3),
5. rinsing the dyed textile from step (4) with water,
6. removing the dyed textile from the rinse water of step (5),
7. drying the dyed textile from step (6),
8. combining the acidic aqueous wastes from steps (1), (3) and (5) and decolorizing same by the process of claim 7,
9. adjusting the pH of the effluent from step (8) to a pH of 4.5 or less,
10. recycling the effluent from step (9) for use in preparing the dye bath in step (1), the scouring water in step (3) and/or the rinse water in step (5).

* * * * *